United States Patent [19]
Olinger et al.

[11] Patent Number: 5,527,554
[45] Date of Patent: Jun. 18, 1996

[54] BULK SWEETENER FOR FROZEN DESSERTS

[75] Inventors: Philip M. Olinger, St. Charles, Ill.; Tammy Pepper, Weybridge, United Kingdom

[73] Assignee: Xyrofin Oy, Helsinki, Finland

[21] Appl. No.: 458,934

[22] Filed: Jun. 2, 1995

[51] Int. Cl.$^6$ .................................................. A23G 9/02
[52] U.S. Cl. ..................... 426/567; 426/548; 426/658; 426/804
[58] Field of Search ........................ 426/565, 566, 426/567, 548, 804, 658

[56] References Cited

U.S. PATENT DOCUMENTS

| | | | |
|---|---|---|---|
| 4,826,825 | 5/1989 | Mitsuhashi et al. | 514/53 |
| 4,855,156 | 8/1989 | Singer et al. | 426/565 |
| 4,917,916 | 4/1990 | Hirao et al. | 426/658 |
| 4,985,270 | 1/1991 | Singer et al. | 426/515 |
| 5,021,249 | 6/1991 | Bunick et al. | 426/96 |
| 5,098,730 | 3/1992 | Pepper et al. . | |
| 5,456,932 | 10/1995 | Fuisz et al. | 426/548 |

*Primary Examiner*—Jeanette Hunter
*Attorney, Agent, or Firm*—Baker & McKenzie

[57] ABSTRACT

An improved frozen dessert made without sucrose or corn syrup solids is provided that employs lactitol and hydrogenated starch hydrolysates as the bulk sweeteners. Aspartame, acesulfame K or other artificial sweeteners may be used as an intense sweetener. The formulation provides a taste and texture qualities that are at least as preferable as conventional products sweetened with sucrose and corn syrup solids and further provides hardness, melting and overrun properties that compare favorably with conventional products sweetened with sucrose and corn syrup solids.

14 Claims, 2 Drawing Sheets

BULK SWEETENER FOR FROZEN DESSERTS

FIELD OF THE INVENTION

This invention relates generally to sugar-free or "no sugar added" food products and more specifically to frozen desserts sweetened without any added sucrose or corn syrup solids. Still more specifically, this invention relates to frozen dessert products that utilize a combination of lactitol and hydrogenated starch hydrolysate as a bulk sweetener.

BACKGROUND OF THE INVENTION

"Frozen dessert" is a generic term that has been applied to a wide variety of products including ice cream, frozen yogurt, frozen custard, ice milk, sherbet, frozen dairy confections and non-dairy dessert. There are two primary sources of calories in frozen desserts: fat and sugar. While fat contributes most of the calories in typical premium ice creams, sugar also contributes a substantial portion of the calories. Hence, reduction of sugar in frozen desserts is an effective way to reduce the calorie content of such desserts. Further, sugar has been linked to a variety of health problems including hypertension, coronary heart disease, arterial sclerosis and dental caries. Sugar or sucrose also increases blood glucose and insulin levels and therefore can be hazardous to people suffering from diabetes. Therefore, the reduction of sugar in one's diet may have health benefits beyond the reduction of calories and weight control.

Typical ice creams and frozen desserts are sweetened with sucrose or a combination of sucrose and corn syrup solids. The combination of sucrose and corn syrup solids (CSS) is generally considered to be the optimum sweetener with regard to taste profile and important properties such as texture, hardness, melting rate and overrun.

The present invention is directed toward reducing the caloric content of frozen desserts by eliminating the addition of sucrose and corn syrup solids to these products. However the elimination of sucrose and corn syrup solids has proven to be problematic and the food industry's quest for adequate non-sucrose/CSS substitutes for use in frozen desserts has not, to date, been very successful.

Generally speaking, any low calorie substitute for sucrose/CSS normally includes two components-an "intense" non-caloric sweetener and an alternative "bulk sweetener". The intense sweeteners such as aspartame, saccharin or acesulfame K provide a relatively high "sweetness equivalent" to sucrose/CSS with little or no added calories. Intense sweeteners have at least two drawbacks. First, intense sweeteners can impart an unpleasant aftertaste even though they are far sweeter per unit weight than sucrose, corn syrup solids and alternative bulk sweeteners. Second, intense sweeteners fail to contribute the body and bulk to the frozen dessert contributed by the sucrose and corn syrup solids.

The "bulk sweetener" or "bulking agent" is used to replace the volume and texture supplied by the sucrose/CSS with substantially less calories than sucrose/CSS. Preferably, the bulk sweetener or bulking agent will also contribute some sweetness equivalent as well and the combination of the intense and bulk sweetener will provide the sweetness equivalent of sucrose/CSS.

Currently available "bulk" sweeteners include monomeric sugar alcohols such as mannitol, sorbitol or xylitol or dimeric sugar alcohols such as isomalt, lactitol or maltitol. Other alternative bulk sweeteners include polydextrose and maltodextrin. However, all of these alternative bulk sweeteners, either alone or in combination, also fail to provide the texture, taste and other qualities demanded by today's consumers. Specifically, known combinations of sugar alcohols and combinations of sugar alcohols with polydextrose and/or maltodextrin all provide a product that is inferior in certain essential properties, namely, taste, texture, hardness, melting rate and "overrun".

Overrun is a measure of the ability of a whipped dessert product to increase in volume during the whipping or mixing process. For example, a product that doubles in volume (i.e. one gallon to two gallons) is said to achieve 100% overrun. Conventional ice cream products, i.e. products sweetened with sucrose/CSS, may achieve a batch freezer overrun in excess of 100%. Non-sucrose desserts made with polydextrose, maltodextrin and sorbitol may achieve batch freezer overruns of less than 100% (92% is a typical value). The lower overruns of the non-sucrose desserts lowers the effective yield because whipped frozen desserts are sold by volume and not by weight.

For example, polydextrose, maltodextrin and sorbitol are combined as the bulk sweetener in several commercially available products. For example, a product containing 5.4% fat, 12% milk solids (non-fat), 9% polydextrose, 2.5% maltodextrin, 3% sorbitol, 0.5% stabilizer, 0.04% aspartame and 0.6% vanilla exhibits a batch freezer overrun of 92% and therefore is more costly to manufacture per unit volume and is higher in caloric density than a competitive product with a 100% overrun. Further, the polydextrose/maltodextrin/sorbitol product was found to be approximately 40% harder than conventional ice creams and therefore less "spoonable". Difficulty in obtaining the product from the container causes frustration to the consumer and makes the consumer less likely to purchase the product a second time. In addition, the formulation was more difficult to mix and did not exhibit good mixing properties. Further, the above product was more difficult to mix and melted at a rate 40% faster than conventional ice creams.

By way of another example, a combination of polydextrose and lactitol was used as a sucrose/CSS replacement in a reduced-fat frozen dessert formulation. The polydextrose/lactitol formulation included 5.4% fat, 12% milk solids (non-fat), 9% polydextrose, 9% lactitol, 0.5% stabilizer, 0.04% aspartame and 0.6% vanilla. The polydextrose/lactitol formulation was found to be much softer than the polydextrose/maltodextrin/sorbitol product discussed above but still 10% harder than conventional ice cream and therefore slightly less "spoonable" than conventional ice creams. Further, the melting rate of the polydextrose/lactitol formulation was 40% faster than conventional ice creams.

Thus, both the polydextrose/maltodextrin/sorbitol combination has proven to be less than satisfactory bulk sweetener alternatives and the polydextrose/lactitol combination proved superior in many respects to the polydextrose/maltodextrin/sorbitol combination.

Hydrogenated starch hydrolysate (HSH) has been used as a sweetener in chewing gum and various candy products. Hydrogenated starch hydrolysates are primarily prepared by the controlled catalytic hydrogenation of corn syrup. The resulting hydrogenated starch hydrolysates are mixtures of monomeric, dimeric and polymeric sugar alcohols. The ratios of these different sugar alcohols provide different hydrogenated starch hydrolysates with different properties. A hydrogenated starch hydrolysate made from a 32–36 dextrose equivalent corn syrup will have an average molecular weight similar to that of regular corn syrup solids. A hydrogenated starch hydrolysate made from 70 dextrose equivalent corn syrup will result in a product that is approximately 50% maltitol and is often referred to as a "maltitol syrup".

Accordingly, there is a need for a bulk sweetener, in either the form of one compound or a combination of compounds, that can be combined with an intense sweetener as an alternative to sucrose/CSS. The alternative bulk sweetener should provide the taste and texture qualities demanded by today's consumer and further should result in a spoonable product that is easy to mix, provides acceptable overrun and further that melts at a rate similar to that of conventional ice creams, if not slower.

SUMMARY OF THE INVENTION

The present invention solves the aforenoted needs by providing a reduced calorie frozen dessert that is sweetened with by a combination of lactitol and hydrogenated starch hydrolysate and at least one intense sweetener. The frozen dessert of the present invention is a no sucrose added reduced-fat frozen dessert having between 0 and 8% fat content. The dessert contains approximately 12% milk solids (non-fat). However, it will be apparent that the milk solids content will vary with the fat content and the bulk sweetener content. The lactitol content will range from 5% to 15% and the hydrogenated starch hydrolysate (HSH) content will range from 5% to 15% on a solids basis. In addition, in the preferred embodiment, a stabilizer in the range of 0.1% to 1% should be employed. To complement the bulk sweetener (lactitol and HSH), aspartame in an amount ranging from 0.015% to 0.045% should be employed as the intense sweetener. Other intense sweeteners such as acesulfame K, saccharin, sucralose, alitame and cyclamates may be employed as an alternative to aspartame. Vanilla in the amount of 0.6% was used to formulate the example shown below; however, other flavors are available and will be readily apparent to those skilled in the art. The quantity of flavor used will depend on the type used, i.e. material or synthetic.

A preferred reduced-fat non-sucrose frozen dessert includes 5.55% fat, 12% milk solids (non-fat), 10% lactitol, 10.67% (wet basis) hydrogenated starch hydrolysate (or 8.0% dry basis), 0.5% stabilizer, 0.03% aspartame and 0.6% vanilla (or other alternative flavoring). The balance of the formulation being water.

It is therefore an object of the present invention to provide an improved bulk sweetener for use in combination with an intense sweetener as an alternative to sucrose and/or corn syrup solids.

Yet another object of the present invention is to provide an alternative bulk sweetener comprising hydrogenated starch hydrolysate and lactitol.

Still another object of the present invention is to provide an improved sucrose-free or sucrose-reduced frozen dessert.

Yet another object of the present invention is to provide an improved frozen dessert with no or a reduced amount of corn syrup solids.

Another object of the present invention is to provide a non-sucrose/CSS frozen dessert that exhibits melting rate, hardness, overrun and taste properties that are similar to that of conventional ice creams.

BRIEF DESCRIPTION OF THE FIGURES

The benefits of the present invention are illustrated graphically in the accompanying figures wherein.

DETAILED DESCRIPTION

The benefits and advantages of the present invention are best understood after comparison of one formulation made in accordance with the present invention with a conventional sucrose/CSS product, a formulation including a combination of polydextrose, maltodextrin and sorbitol and yet another formulation containing a combination of lactitol and polydextrose.

An example of one formulation made in accordance with the present invention is presented as Example 1 below.

| EXAMPLE 1 | |
| --- | --- |
| Ingredients | Weight Percentages |
| Fat | 5.55% |
| Milk solids (non-fat) | 12% |
| Lactitol (Lact) | 10% |
| Hydrogenated Starch Hydrolysate (HSH) | 10.67% (wet basis) 8.0% (dry basis) |
| Stabilizer | 0.5% |
| Aspartame | 0.03% |
| Vanilla | 0.6% |

The product formulation of Example 1, i.e. the "HSH/Lact formulation", was prepared in a 300 pound batch and frozen in a continuous ice cream freezer to a 90% overrun. Thirty-four pounds of the mix were also frozen in a batch freezer for characterization of the overrun development.

Figure 1:
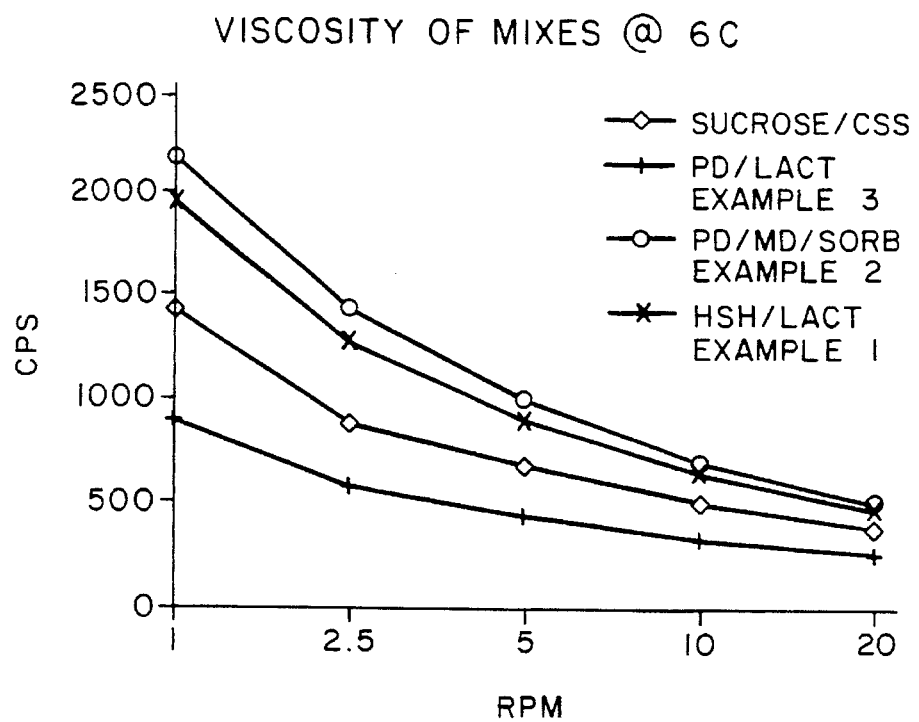
FIG. 1 is a graphical comparison of the viscosity of four different frozen dessert formulations, one of which is formulated in accordance with the present invention.
Figure 2:
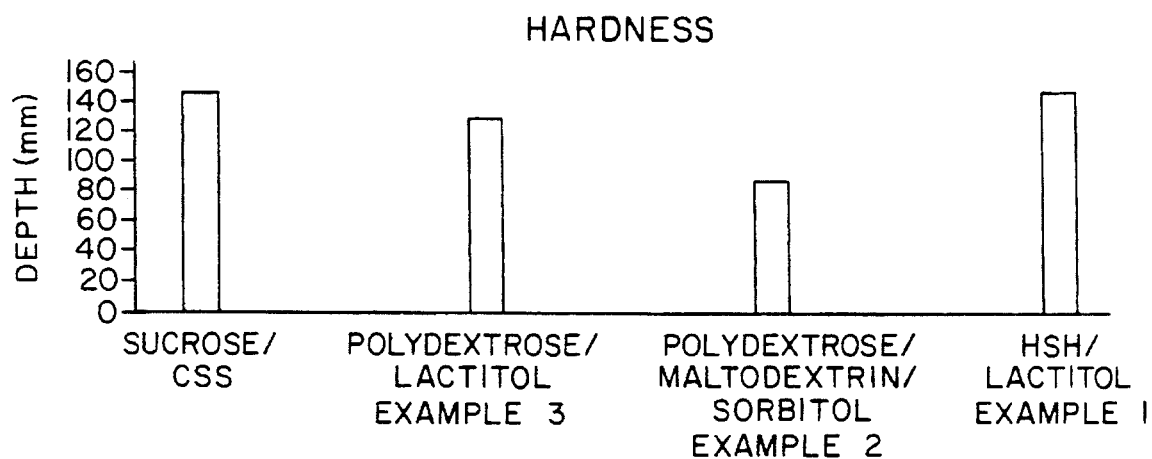
FIG. 2 is a bar graph illustrating hardness properties of four frozen dessert formulations, one of which is formulated in accordance with the present invention wherein hardness is determined by penetration (mm) of the test ice cream at 18° C.

The viscosity of the HSH/Lact formulation (Example 1) was similar to a conventional product made with sucrose/CSS as shown in FIG. 1. The hardness of the HSH/Lact formulation (Example 1) was also similar to a product conventionally made with sucrose/CSS as shown in FIG. 2. Specifically, an instrument penetrated the sucrose product 145 millimeters at 18° C.; an instrument penetrated the HSH/lactitol formulation of the present invention (Example 1) 148 millimeters at 18° C. Finally, referring to FIG. 3, the HSH/Lact formulation took seventy-three minutes to drip 10 milliliters at ambient temperature which is longer than the sixty-four minutes it took the conventional sucrose/CSS product to drip 10 milliliters at ambient temperatures. Hence, the melting characteristics of the HSS/Lact formulation are superior to the conventional sucrose/CSS product. It should also be noted that the HSH/Lact formulation produced a maximum overrun of 103%, which compares favorably to the 107% maximum overrun provided by the conventional sucrose/CSS product.

The superiority of the present invention is best understood after comparing the properties of the HSH/Lact formulation shown in Example 1 with the formulations shown in Examples 2 and 3 which are made with different bulk sweeteners and, hence, not in accordance with the present invention.

A formulation made with polydextrose, maltodextrin and sorbitol (PD/MD/Sorb) is illustrated in Example 2.

EXAMPLE 2

| Ingredients | Weight Percentages |
| --- | --- |
| Fat | 5.4% |
| Milk solids (non-fat) | 12% |
| Polydextrose (PD) | 9% |
| Maltodextrin (MD) | 2.5% |
| Sorbitol (Sorb) | 3% |
| Stabilizer | 0.5% |
| Aspartame | 0.04% |
| Vanilla | 0.6% |

Figure 3:
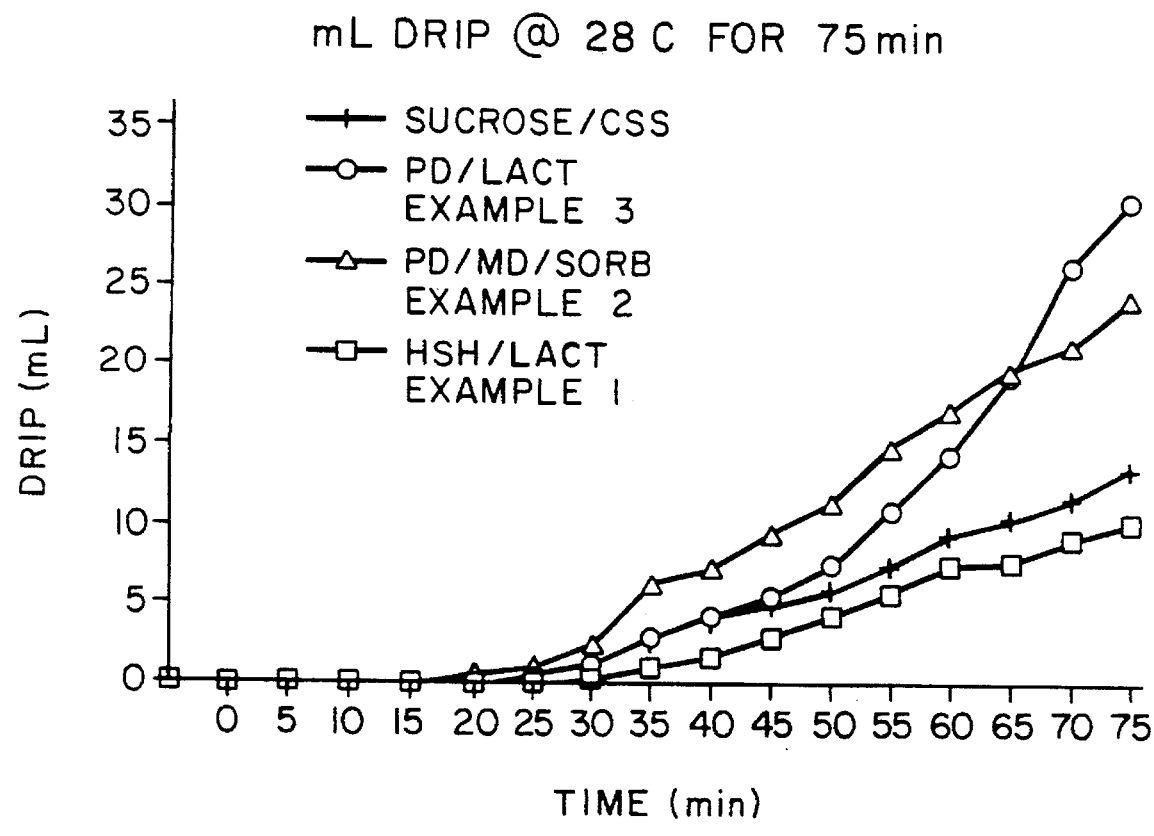
FIG. 3 is a graphical comparison of the melting rate of four frozen dessert formulations, one of which is formulated in accordance with the present invention.

The relevant properties of this formulation are also illustrated in FIGS. 1, 2 and 3. Specifically, the PD/MD/Sorb formulation of Example 2 exhibits a substantially higher viscosity than the conventionally sweetened sucrose/CSS reduced-fat product. Hence, it is harder to mix than the conventionally sweetened sucrose/CSS reduced-fat product. Further, the PD/MD/Sorb formulation of Example 2 was substantially harder (see FIG. 2) and melted faster (see FIG. 3) than the conventionally sweetened sucrose/CSS reduced-fat product and the HSH/Lact of Example 1. In addition, the PD/MD/Sorb formulation of Example 2, which is extremely similar to commercial reduced-fat products that are currently on the market, exhibited a maximum overrun of only 92%. Thus, the PD/MD/Sorb formulation of Example 2 provides a volume yield of 11% less than the HSH/Lact formulation of Example 1 and further provides a volume yield of 15% less than the conventional sucrose/CSS product.

A product made with a combination of polydextrose and lactitol (PD/Lact) is provided in Example 3.

EXAMPLE 3

| Ingredients | Weight Percentages |
| --- | --- |
| Fat | 5.4% |
| Milk solids (non-fat) | 12% |
| Polydextrose (PD) | 9% |
| Lactitol (Lact) | 9% |
| Stabilizer | 0.5% |
| Aspartame | 0.04% |
| Vanilla | 0.6% |

As shown in FIGS. 1, 2 and 3, the PD/Lact formulation of Example 3 is also substantially inferior to the HSH/Lact formulation of Example 1 (i.e. the present invention) and the conventional sucrose/CSS product. Specifically, referring to FIG. 2, the PD/Lact formulation of Example 3 is 10% harder than the conventionally sweetened sucrose/CSS reduced-fat product and 11% harder than the HSH/Lact product of the present invention. Further, referring to FIG. 3, the PD/Lact formulation of Example 3 melted 18% faster than the conventionally sweetened sucrose/CSS reduced-fat product and 28% faster than the HSH/Lact product of the present invention. Specifically, it took the formulation of Example 3 only 52.5 minutes to drip 10 milliliters at ambient temperatures; it took the conventionally sweetened sucrose/CSS reduced-fat product 64 minutes to drip 10 milliliters; in contrast, the HSH/Lact formulation made in accordance with the present invention took a full 73 minutes to drip 10 milliliters at ambient room temperature.

Referring back to FIG. 2 and the property of hardness, a formulation made in accordance with the present invention (HSH/Lact) and the conventionally sweetened sucrose/CSS reduced-fat products exhibited similar hardness. The polydextrose/lactitol (PD/Lact) formulation (Example 3) was 10% harder than the conventionally sweetened sucrose/CSS reduced-fat product and the polydextrose/maltodextrin/sorbitol (PD/MD/Lact) product (Example 2) was a full 40% harder than the sucrose/CSS product. The HSH/Lact formulation of the present invention, the sucrose/CSS conventionally sweetened product and the PD/Lact formulation (Example 3) all exhibited similar overruns (i.e. greater than 100%). However, the commercially available formulation, i.e. the PD/MD/Sorb formulation of Example 2, exhibited an overrun of only 92%, resulting in a substantially lower yield. The melting rate of the HSH/Lact formulation of the present invention had a superior melting rate which was 12% slower than the conventionally sweetened sucrose/CSS reduced-fat product. The PD/Lact formulation (Example 3) and the PD/MD/Sorb formulation (Example 2) had melting rates which were much faster than the melting rate of the formulation of the present invention and the sucrose/CSS formulation.

Thus, the HSH/Lact formulation of Example 1 and, in general, a frozen dessert sweetened with a combination of hydrogenated starch hydrolysate and lactitol along with an intense sweetener provides a product with essential properties that are similar to that of sucrose/CSS products, which, of course, is the benchmark upon which low fat and low calorie frozen dessert products are measured. In addition, in a taste test survey taken to estimate the consumer acceptability of each product, the HSH/Lact formulation was at least as preferred as the conventionally sweetened sucrose/CSS reduced-fat product. Further, the HSH/Lact formulation of the present invention was very significantly preferred over the PD/MD/Sorb formulation of Example 2 (polydextrose/maltodextrin/sorbitol) and was very significantly preferred over the PD/Lact formulation of Example 3 (polydextrose/lactitol).

In summary, an improved reduced-fat non-sucrose added frozen dessert has been provided that has important properties remarkably similar to conventional reduced-fat products sweetened with sucrose and corn syrup solids. Further, the product of the present invention is at least as preferred as the conventionally sweetened sucrose/corn syrup solids reduced-fat product.

The combination of hydrogenated starch hydrolysate and lactitol as a sweetener will also work in frozen desserts having either a lower or a higher fat content. Specifically, the HSH/lactitol combination will work in frozen desserts having fat contents ranging from 0 to 12%. Further, the lactitol content may vary from 5% to 15% and the HSH content may range from 5% to 15%. Further, the milk solids content may also range from 7% to 17%, depending on the lactitol, HSH and fat contents.

Aspartame is the preferred intense sweetener; however, it is anticipated that saccharin and other intense sweeteners will work as well.

One preferred hydrogenated starch hydrolysate is sold under the trademark HYSTAR 3375, by Lonza, Corp. HYSTAR 3375 includes sorbitol, maltitol and higher polyols and is particularly suited for frozen dessert applications because its molecular weight is similar to that of typical corn syrup. HYSTAR 3375 is fabricated from 32–36 dextrose equivalent corn syrup solids.

It is also anticipated that different grades of hydrogenated starch hydrolysates will also work in combination with lactitol. Specifically, it is anticipated hydrogenated starch hydrolysates fabricated from 60–80 dextrose equivalent corn syrup will also be appropriate. These hydrogenated starch hydrolysates comprise approximately 50% maltitol and are often characterized as maltitol syrups.

Although only one specific formulation of the present invention has been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

We claim:

1. A reduced calorie frozen dessert comprising:

from 0% to about 12% fat;

from about 5% to about 15% lactitol;

from about 5% to about 15% of a second bulk sweetener;

from about 7% to about 17% milk solids;

from about 0.01% to about 0.5% intense sweetener; and water.

2. The dessert of claim 1, wherein the second bulk sweetener is selected from the group consisting of mannitol, sorbitol, xylitol, isomalt, maltitol, polydextrose, maltodextrin, corn syrup solids having a low dextrose equivalent, and hydrogenated starch hydrolysate.

3. The dessert of claim 1, wherein the second bulk sweetener is hydrogenated starch hydrolysate.

4. The dessert of claim 3, wherein the hydrogenated starch hydrolysate is prepared from a catalytic hydrogenation of a corn or syrup having a dextrose equivalent of between about 20 and about 80.

5. The dessert of claim 1, wherein the intense sweetener is selected from the group consisting of aspartame, acesulfame K, saccharin, sucralose, alitame, cyclamate, either alone or in combination.

6. The dessert of claim 1, further comprising from about 0.1% to about 1% stabilizer.

7. The dessert of claim 1, wherein the total solids content ranges from about 30% to about 40%.

8. A reduced calorie frozen dessert comprising:

from 0% to about 12% fat;

from about 5% to about 15% lactitol;

from about 5% to about 15% hydrogenated starch hydrolysate;

from about 7% to about 17% milk solids;

from about 0.01% to about 0.5% intense sweetener; and water.

9. The dessert of claim 8, wherein the intense sweetener is selected from the group consisting of aspartame, acesulfame K, saccharin, sucralose, alitame, cyclamate, either alone or in combination.

10. The dessert of claim 9, further comprising from about 0.1% to about 1% stabilizer.

11. The dessert of claim 10, wherein the total solids content ranges from about 30% to about 40%.

12. The dessert of claim 11, wherein the hydrogenated starch hydrolysate is prepared from a catalytic hydrogenation of a corn or syrup having a dextrose equivalent of between about 20 and about 80.

13. The dessert of claim 12, wherein the hydrogenated starch hydrolysate is prepared from a catalytic hydrogenation of a wheat syrup having a dextrose equivalent of between about 20 and about 80.

14. A reduced calorie frozen dessert comprising:

from about 4% to about 8.0% milk fat;

from about 9% to about 11% lactitol;

from about 9% to about 12% hydrogenated starch hydrolysate (wet basis);

from about 11% to about 13% milk solids;

from about 0.3% to about 0.7% stabilizer;

from about 0.02% to about 0.04% aspartame; and water.

* * * * *